United States Patent [19]

Rapaport et al.

[11] 4,420,575

[45] Dec. 13, 1983

[54] WATER REDUCIBLE AEROSOL PAINTS

[75] Inventors: Stanley Rapaport, Shaker Heights; Francis J. Cachat, Rocky River, both of Ohio

[73] Assignee: Plasti-Kote Company, Inc., Medina, Ohio

[21] Appl. No.: 401,838

[22] Filed: Jul. 26, 1982

[51] Int. Cl.³ ........................... C09D 3/66; C09D 5/02
[52] U.S. Cl. .................... 523/504; 106/252; 106/253; 523/500; 523/501; 523/502; 523/503; 523/526; 524/114; 524/378; 524/903
[58] Field of Search ............... 106/252, 253; 523/500–504, 526; 524/376, 378, 903, 114; 525/7, 7.4

[56] References Cited

U.S. PATENT DOCUMENTS

| | | | |
|---|---|---|---|
| 1,892,750 | 1/1933 | Rotheim | 29/213 |
| 2,795,564 | 6/1957 | Conn et al. | 524/762 |
| 2,985,602 | 5/1961 | Broadhead | 524/601 |
| 3,998,775 | 12/1976 | Taub | 524/903 |
| 4,056,495 | 11/1977 | Kawamura et al. | 106/252 |
| 4,066,596 | 1/1978 | Stern | 524/903 |
| 4,115,336 | 9/1978 | Crouzet | 523/504 |
| 4,125,499 | 11/1978 | Howard | 525/7 |
| 4,133,786 | 1/1979 | Harris et al. | 525/7 |
| 4,187,204 | 2/1980 | Howard | 524/605 |
| 4,240,940 | 12/1980 | Vasishth et al. | 524/903 |
| 4,259,219 | 3/1981 | Eschwey et al. | 106/252 |
| 4,265,797 | 5/1981 | Suk | 524/903 |
| 4,335,163 | 6/1982 | Wong | 524/378 |

FOREIGN PATENT DOCUMENTS 54-33545  3/1979  Japan ................... 524/903

Primary Examiner—Ronald W. Griffin
Attorney, Agent, or Firm—Fay & Sharpe

[57] ABSTRACT

An aerosol paint system under sprayable pressures in the container is provided comprising two film-forming polymeric binders. One of the two being monomer modified alkyd resin of relatively low molecular weight having an acid value (before neutralization with selected bases) of about 40 to 80 and the second polymeric binder of water-reducible nature being an emulsion polymer latex of high molecular weight, but capable of forming a continuous film in the total aerosol paint system aided by the monomer modified alkyd and a selection from co-solvents including in a first group low molecular weight alcohols, ketones, and esters and in a second group the co-solvents illustrated by the Cellosolves, Cellosolve acetates and other esters and the Carbitols as to chemical class.

Pressures essential to spray application are principally provided by dimethyl ether and closely related ethers as a class.

11 Claims, No Drawings

WATER REDUCIBLE AEROSOL PAINTS

SUMMARY OF THE INVENTION

An aerosol paint formulation is provided which contains a water-reducible resin system preferably containing two classes of polymeric organic binders. This bimodal water-dispersible polymeric resin pigment-binding system contains from about 95–5% of a water-reducible monomer modified alkyd resin having an acid value before neutralization with a water-solubilizing base of from about 40 to 80. 5–95% of the water-reducible resin system consists of an emulsion polymerized latex of significantly higher molecular weight of the order of 500,000 to 1,000,000; but preferably having a Tg permitting formation of continuous, adhesive polymeric film in conjunction with the foregoing monomer modified alkyd resin and volatile co-solvents which comprise from 5–30% of the total paint formulation, one group of co-solvents being selected from the class consisting of low molecular weight volatile alcohols, ketones, and esters which volatilize relatively rapidly as compared with a second set of higher molecular weight volatile co-solvents which include glycol ethers and esters and blends thereof and stay in the film to aid resin consolidation.

The aforementioned group of monomer modified alkyd resins include drying oil modified alkyd resins which are further monomer modified with vinyl monomers (including styrene), acrylic monomers (including esters and acrylic anc methacrylic acids).

The higher molecular weight latex emulsion polymers include a number of various commercial "paint latex" products including styrene-butadiene, styrene-acrylic, acrylic-methacrylic copolymers, etc., preferably capable of forming continuous films from aqueous solvent carriers at room temperatures.

The water-reducible monomer modified alkyd resins of low molecular weight are made water-reducible by neutralization of their acid values to a pH of about 8.0 to 8.5 with low molecular weight amines, ammonia, and lithium bases; preferably using lithium as an initial neutralizer to about 20–60% of the acid value of the alkyd and completing the pH shift with ammonia to about 8.5.

The propellant is preferably soluble in water. A major proportion of the propellant is also a co-solvent for the polymeric binder resins in the container. This solvent portion of the propellant is preferably dimethyl ether and constitutes from about 20–40% of the total aerosol paint system in the pressurized volume of the aerosol paint product. Minor proportions of well known propellant hydrocarbons including propane, butane, isobutane, and the class of fluorochloro hydrocarbons well known in aerosol products can also be used as part of the propellant phase to increase the spraying pressure to atomize the pressurized liquid paint as may be required.

Water will generally constitute from about 15–40% of the pressurized aerosol paint system.

BACKGROUND OF THE INVENTION

Aerosol paints using conventional solvent reduced pigmented organic polymeric binders have found wide acceptance because of their ready availability to apply paint coatings without the comcomitant clean up problems associated with brushing applications and the brush-marks not found with spray coatings. Until recently, aerosol paints were conventionally water-free, solvent thinned products formulated with propellants of the fluorochloro hydrocarbon class. Concern over fluorinated hydrocarbon propellants in the atmosphere gave impetus to use of non-fluorinated or halogenated propellants, primarily low molecular weight hydrocarbons such as butane, propane, hexane, heptane, etc., which were flammable.

With the development of water-reducible paint systems characterized by ease of application, ready clean up, and freedom from fire hazard, water-containing systems in aerosol paints became of major interest. Water-containing aerosol spray paints have the advantage of low toxicity levels, noncombustible spray paint systems, and in some cases ready clean up with soap and water after completion of the paint application.

The following patents are of interest in the development of the aerosol paint art and the present invention.

Howard U.S. Pat. No. 4,187,204, takes advantage of resinous synthetic polymers or paint binders; illustratively, maleinized oils, oil modified alkyds, copolymer oils, epoxy resins, etc., having sufficient carboxyl groups (acid value) to be solubilized in water by neutralization of the acid groups present. Howard's products contained some water, generally less than 8%. Acid values of the resins were neutralized with ammonia and amines, and dissolved in water-soluble solvents. Howard includes the lower molecular weight hydrocarbons fluorocarbons, etc., $CO_2$, nitrous oxide, cyclopropane, etc. Among the host of non-distinguished propellants dimethyl ether was named. The water content was limited to less than 8% however.

U.S. Pat. No. 3,998,775 Taub is primarily related to water-in-oil type emulsion paints wherein the binder phase is a vinyl acetate acrylic copolymer containing a pigment in a liquid hydrocarbon component. A surfactant aids in stabilizing the emulsion formed.

Stern in U.S. Pat. No. 4,066,596 relates to a particular mechanical valve for dispensing aqueous acrylic latex emulsions.

Broadhead U.S. Pat. No. 2,985,602 teaches the concept of producing a low molecular weight alkyd resin having an acid value between 6 and 25 which is made water-dispersible by neutralization with lithium hydroxide.

U.S. Pat. No. 4,240,940 Vasishth et al. teaches an aerosol paint which is capable of being cleaned up with water containing from 8%, but preferably less than 1% of water in which the binder vehicle solids are a water-reducible alkyd resin dissolved in a solution of Butyl Cellosolve and n-butanol. Other solvents for the water-reducible alkyd are ethylene glycol monobutyl ether, Butyl Carbitol and V.M.&P. Naphtha.

U.S. Pat. No. 4,125,499 Howard uses organic co-solvents including acetone, ethers, ethylene glcyol n-butyl ether, etc. with about 5% of water with some water-soluble alkyd resins (Aquamac 1200, Kelsol 3902, etc.). Aliphatic hydrocarbons and halofluorocarbons and methyl ethers including dimethyl ether are used in propellant admixtures.

Suk U.S. Pat. No. 4,265,797 reduces an aerosol paint using up to 30% propellant which includes among the other water-miscible propellants, dimethyl ether. The resins disclosed appear to be very similar to Rohm & Haas U.S. Pat. No. 2,795,564.

Rotheim U.S. Pat. No. 1,892,750 teaches use of dimethyl ether among other propellants for dispensing a spray of liquid from a pressurized container.

Attention is also directed to a Suk Belgium Pat. No. 890,564 of Jan. 18, 1982 which contains from 10–50% water and from 0–50% dimethyl ether and another propellant in conjunction with up to 45% polar organic co-solvents in an aqueous aerosol paint system.

DETAILED DESCRIPTION OF THE PREFERRED EMBODIMENT OF THE INVENTION

This invention is directed to improved water-containing aerosol paints in which the normally gaseous liquid propellant in the pressurized container is substantially soluble in the aqueous phase. By way of comparison, early propellant containing aerosol paints contained no aqueous phase components. The entire pressurized system was a solvent for, and soluble in, a homogeneous low-boiling liquid water-insoluble solvent phase. As the vehicle solid solvents were essential, pressurizing agents were often flammable, often of toxic nature, and often of noticeable odor. Upon use of the pressurized paint system, interest in water-reducible, aerosol paint systems developed.

Aerosol paints developed are substantially odorless, non-flammable, and formulated with paint systems which are water-reducible in viscosity for spray application. Water-reducible aerosol paints developed a ready acceptance in the market place.

This invention comprises a ready-to-spray paint system in a pressurized aerosol container. The paint in the original liquid state is water-reducible and contained about 20 to 40% water in the final aerosol paint package. It is more usual that water-containing paints systems have relatively low specular reflection or gloss. Gloss of the deposited film is generally measured at an angle of 60° C. when compared with gloss of a black mirror at the same angle at 100%. Most often, glosses of water-reducible paint systems, and particularly those deposited from aerosol paints containing water-thinnable contents, have glosses comparable with hens' eggshells or something less than about 85% at a 60° angle.

The aerosol paints of this invention have developed improved gloss quality and relatively rapid dry by the combination of use of a propellant which has excellent miscibility with water as well as a combination of film-forming resins or varnish solid binders; the combination being water-reducible and stably suspended in the volatile portions of the paint film-forming non-volatile components (in a pressurized paint system in an aerosol container).

The film-forming binder solids essential to the ends of this invention preferably comprise two qualities of water-dispersible organic polymer solids. These solid polymers correlate to one another so that upon evaporation of their volatile diluents (which constitute water, organic solvents, and a combination of a number of non-volatile additives, some parts of which are carried into and uniformily suspended in the system by volative liquid carriers) coalesced films are formed.

The essential film-forming binder solids contain a blend of monomer modified alkyd resins. These alkyds are characterized by relatively high acid values (40–80) and low molecular weights (less than about 2000). The monomer modification is standardly a drying oil moiety.

In addition to the drying oil fatty acid monomer modification these water dispersible alkyds may be modified with other polymerizable monomers including acrylic acids and esters, and vinyl monomers as illustrated by styrene and oil modified alkyds referred to in the art as "chain stopped alkyds."

The also contain small but effective amounts of a second quality of polymeric organic binder solids which are emulsion copolymers of unsaturated organic monomers, often in chemical union with monomer modified alkyld resins, but of relatively high molecular weight as compared with the predominantly water-soluble monomer modified alkyd resins. Importantly, the molecular weights and the components must not be so remote in chemical structure from the initial lower molecular weight alkyd resins so as to be incompatible with one another. When blended together in a water-dispersed form and applied at room temperatures and pressures (to test substrates for example) thin films of blends proposed for use may be tested and checked out for essential compatibility by drawing down their mixtures on test paper for observation of gloss and drying rate as indicative of their usefulness herein.

In the broadest aspect of this invention it is not essential that one employ water-dispersible resins of low molecular weight (less than 2,000) with those of high molecular weight (more than about 10,000) but advantages are obtained which are improvements to the final film quality of the aerosol deposited paint films of this invention when the latter is present in the binder phase of the composition.

It is also not essential to the ends of this invention to water-solubilize the high acid value water-dispersible monomer modified alkyd resins of this invention initially with inorganic lithium bases as disclosed by Broadhead in U.S. Pat. No. 2,985,602, but advantageous results have been observed in the ultimate quality of the aerosol paint films when this method has been followed and a preferred composition is thereby obtained.

The general practice in the prior art of producing water-dispersible monomer modified alkyd resins has been to neutralize the excess acidity of these alkyds with water-soluble low molecular weight amines and ammonia and such practices are not to be precluded.

In the water-dispersible aerosol paints of this invention it has been found advantageous to neutralize, at least in part, the foregoing acid values of the non-volatile binder vehicle of the paint system from about 10% to as high as about 80% with a fixed alkali. While sodium and potassium are useful, it is preferred to use the generally smaller metallic ion, particularly the lithium ion, for this initial water solubilizing step with the monomer modified alkyds of this invention. However, as the pH of the final products should preferably be above about 7.5 and preferably not above about 8.8 (because of possible hydrolysis of the polymeric esters), it is preferred to use a volatile alkaline material in making the final adjustment in the pH of the paint system for aerosol end use. Aqueous ammonia solutions provide means to this end. It is also permitted to use lower molecular weight amines, illustratively the alkanol amines including methyl and ethyl alkanol amines for this purpose.

The above neutralization procedures provide essential water reducibility and compatibility of the non-volatile high acid value resinous binder portion of the paint system. However, it is also believed that these "soaps" also contribute to foaming problems when using the prior art gaseous propellant as the major part of the pressurizing propellant phase.

As is well understood in the prior art of conventional, water-insoluble and water-free aerosol paint systems, the propellants have heretofore been primarily low molecular weight gaseous hydrocarbons and fluorohydrocarbons ("Freons") which are not generally considered water-soluble products. A common problem associated with the extremely heterogenous formulations of aerosol paints of this phase complexity, foaming was a common difficulty requiring fine formulation balances to keep foaming under control. Foam cavitation in deposited film coatings often led to permanent film imperfections.

In the combination of the water-dispersible resin binders of this invention, the use of lower molecular weight gaseous ethers at standard temperature and pressure as the propellant, sufficiently small so that high water compatibility could be maintained, was found particularly advantageous. Among the propellants independent of cost considerations found useful in the aerosol paints of this invention were methyl ethyl ether, dimethyl ether, propylene oxide 1-3, and propylene oxide 1-2. Propylene oxide 1-3 has greater water-solubility or compatibility being infinitely water-soluble. The 1-2 homologue is soluble to the extent of about 33 parts per 100 parts of water and is operationally useful. However, dimethyl ether has recently become commercially available as a propellant in aerosol system. It has since been investigatively employed in development work of the aerosol paints of this invention. It has been found useful, not only as a major proportion of the propellant phase essential to efficient atomization of the aerosol paint for application purposes, but also because it appears to provide excellent co-solvency in conjunction with the specific blends of organic solvents, individuals of which have been an active part of paint technology for a long time, including as illustrative lower molecular weight alcohols and ketones, the alkylene glycol mono butyl ethers and esters. These solvents also exhibit some cosolvency in water-organic solvent blends tending to keep the heterogenous liquids of the paint compositions as they are deposited from the aerosol spray nozzle in a fine spray compatible. As the more volatile propellant phase evaporates from the film, the heavier slow evaporating solvents aid in establishing coalesence of the wet film. High gloss levels of aerosol paints containing a water phase have often been difficult to produce due to the heterogeneity of the paint film deposit. Compatibility of the propellant, it is believed, with both the water phase and the organic phase, contributes to the general high gloss and relatively fast film dry of the aerosol paints of this invention.

Having introduced the importance of the solubility of the propellant in the aqueous phase, and the finding that superior films appear to be developed from aerosol (pressurized) spray paints containing water-soluble propellants in conjunction with the combination of water-dispersible or soluble combination of water-dispersible or soluble monomer modified alkyd resins (including drying oil modified alkyds) of low molecular weights of from about 1,800 to preferably not above about 6,000, with emulsion polymer dispersions having a molecular weight range that may be as much as ten to a hundred times the molecular weights of the monomer modified alkyds, and may reach the order of about 500,000 molecular weight. Illustrative mention and review of a number of commercially available products within this broad group of film-forming resins known in the paint art are included herein and in the examples to provide orientation.

Water-soluble monomer modified alkyd resins of molecular weights within the range of 1,800 to about 6,000 are believed to include as illustrative Spencer-Kellogg (Division of Textron) resins Kelsol 3900, Kelsol 3902, Kelsol 3920, and Kelsol 3921. Cargill also has a number of useful products understood to be in the above general class which include Cargill WR7407, Cargill 7415, Cargill Alkyd 7201-80; Ashland Oil Company Arolon 969, 363, 376 and 557-D-70; McWhorter's Aquamac 1000; and Reichhold Chemical has a series of water-dispersible alkyd resins including one identified as 13-400. Experience has indicated that the shorter oil length, oil modified alkyd resins tend to be less compatible in the combinations found preferable herein for the aerosol water-based enamels of this invention.

Where the percentage of monomer modification (including drying oil modification) is increased to what are described as "medium" length or "long" oil modified alkyds, better compatibility with the emulsion polymerized resins is indicated in the dry films. It is also to be noted that the limitation to monomer modification of the alkyds need not be limited solely to "drying oil monomer" modification, but that monomers including styrene and acrylic monomer modification illustratively STF 1170 an acrylic modified alkyd resin (of Reichhold Chemical), and WR-4005 (of Reliance) are useful monomer modified alkyd resins.

The high molecular weight emulsion polymerized latices useful in combination with the major low molecular weight alkyds above, are also commercially available. Among those found useful in some of the developmental products of this series of aerosol paint products are Rohm and Haas resins AC 490, WL81 and WL91. The latter resin has been indicated to coalesce to form more compatible films at temperatures of about 52°-60° C. Amsco Resin of Union Oil Company has also been found useful in developmental work.

In general, it has been found preferable to keep the glass transition temperatures of the high molecular weight resins (Tg) as close to room temperatures as availability will permit. Temperatures (Tg) of as high as 33° C. (Darex X-442 of W. R. Grace and Co.) a styrene-acrylic copolymer and Celanese CL222, a polyvinyl acetate-acrylic latex have provided useful high molecular weight latices for paint film combinations as disclosed herein.

U.S. Pat. No. 3,795,564 is referenced to provide illustrative details relative to known art in the manufacture of emulsion polymer latices useful for the present purpose of aerosol paint manufacture.

In selection of high molecular weight emulsion polymer latices for the composition of this invention, it is preferred to use those containing principally non-ionic emulsifiers. Present experience indicates problems of foam formation having been noticeably reduced when the presence of anionic emulsifiers of the commercial classes used as wetting agents and surfactants are present, if at all, in very small quantities.

The film-forming binder portion of the water-containing aerosol paints of this invention are broadly useful when the organic film-forming solids contain from about 95–5% of the low molecular weight monomer modified alkyd resin solids and from 5–95% by weight of the high molecular weight emulsion polymerized latices as disclosed. Small amounts of other film-forming solids may also be included for special effects, but are not an essential part of this invention. However, they are not to be considered excluded from the concepts developed.

A most important factor in the determination of useful ratios of the monomer modified alkyd resin to the higher molecular weight latex copolymer emulsion is the resultant formulation of a cohesive binder film. The glass transition temperature or Tg is a valuable guide in this determination, as is the film-forming temperature of the polymeric solids blend. The higher the Tg and/or film-forming temperature of the emulsion polymer solids, the greater the ratio or percent of compatible water-dispersible monomer modified alkyd resin solids phase becomes of the total non-volatile binder solids component of the paint film when deposited. As the Tg of the emulsion polymer increases above room temperature, or about 25° C., then the presence of larger percentages of the solids or non-volatile vehicle of monomer modified alkyd may be used in increasing quantities to obtain coherent film dry paint films without ancillary heat.

Two general classes of volatile organic solvents are preferably used in combination. These include the simple lower molecular weight alcohols, ketones, and esters as well as the higher molecular weight co-solvents both classes of which are water-soluble or water-miscible. Volatile solvents which are a part of the freshly deposited paint film constitute from about 5% to not more than about 30% of the aerosol paint (exclusive of the propellant volatiles).

Illustrative of the first group are methanol, ethanol, isopropanol, butanol, acetone, diethyl ketone, ethyl acetate, etc.

Illustrative of the co-solvents are commercial products known as "Cellosolves," Carbitols, etc., which include glycol ethers, illustratively ethylene glycol mono alkyl ethers (ethylene glycol mono butyl ether, etc.) and ethylene glycol mono alkyl acetates (ethylene glycol mono methyl ether acetate, etc.).

The aerosol paints or coatings of this invention may be pigmented or not pigmented depending upon the quality and color of the dry film desired. Clear coatings depositing high gloss films may contain no pigmentation. If a dull film is wanted, inert (having a low index of refraction) pigments are sometimes employed. Black and more opague pigments can provide high opacity and high gloss products with small amounts of pigment to non-volatile vehicle solids. Above about 12% of pigment in the total paint composition (absent the propellant phase) will generally materially interfere with the specular reflection or gloss of the deposited dry aerosol films.

The completely packaged, ready-to-use, formulated aerosol paints of this invention consist essentially of from 5% to about 15% total of organic polymeric film-forming solids from each of the foregoing classes, from about 15% to 40% water, from 5% to about 30% of volatile organic solvents for the liquid paint exclusive of propellants from each of the foregoing classes, and 20% to 40% of a pressure-liquified oxygenated co-solvent propellant gas selected from the group consisting of dimethyl ether, methyl ethyl ether, diethyl ethyl and propylene oxide 1, 2 and 1,3 providing an internal pressure in the aerosol packaged paint of from about 2 to 6 kg/cm². Pigment may be included.

The use of dimethyl ether as a propellant in aerosol paints has recently been promoted and developed by a large supplier (duPont) and has been disclosed as a useful propellant in the published prior art. However, from the prior art known, there appears to be a failure to recognize the specific value in water-containing aerosol paint systems and the functional value of the above ethers in the package as a beneficial co-solvent for aqueous resin polymers particularly of the class as found beneficial in the combination above disclosed.

While it is not a desire to be bound by theory, the increased homogeneity of the aerosol paint system, including the water phase, the diverse polymeric binder phase, and the ancillary solvents present brought about in the above described pressurized system suggests a synergistic co-action of the water-soluble propellant, the water-miscible volatile solvents, and the water-dispersible polymeric binders to produce an improved quality in the freshly deposited spray applied film of paint as well as in the quality of the dried coating of paint film resulting.

The amount of dimethyl ether or related ether pressurizing (gas) liquid present in the total propellant in the aerosol paint package may be from about 10% to about 40% by weight of the standardized paint composition so pressurized. It is also preferred to employ at least about 25% of the propellant phase by weight as one of the ethers described, such as dimethyl ether.

As is well known in paint formulation, there are a host of minor additives employed in paint systems too numerous to identify completely. However, small amounts of plasticizers, metallic driers such as cobalt soaps, anti-skinning (anti-oxidants) agents to prevent premature oxidation of the liquid paint system, flow-control agents (Dow Corning P.A. #14) to overcome orange peel in spray applied coatings, coalescent solvents (see: Emmons U.S. Pat. No. 4,141,868) which aid coalescence of emulsion polymer latex products having Tg's above about 30° C., anti-foaming agents, etc.; all are potential sources of minor paint additives which may be useful and used in the aerosol paint formulations of this invention without departing from the scope of the appended claims. Total miscellaneous paint additives will generally not constitute more than about 5% by weight of the total aerosol can content when factory filled for shipment.

The procedure found useful in the examples below follow a general plan of many paint manufacturers. First, a base product is prepared by mixing the pigment (if present) with a commercially available monomer modified alkyd resin having an acid value from about 40 to 80; further added are 50–80% of binder solids. The base product has approximately one-third the water, about one-fourth of the alkaline agent (either a lithium base dissolved in water or ammonia or amine), cobalt drier and drier catalysts or other drier adjuvant electively along with a portion of the water-soluble or miscible organic co-solvents. Many additives used for special effects and special ends in general paint manufacture can be added at this point, or they may be added to the pigmented product after grinding (pigment dispersion) in what may be termed the "let down" or "thin down" portion of the total formulation. As the volume put through the grinding phase carries a greater cost charge, it is customary to make most convenient additions subsequent to the grinding step. The grinding portion must be sufficiently fluid, however, to function in the equipment selected for the pigment dispersion phase step.

It is convenient to produce the dispersion of the above system in a bead mill or sand mill, illustratively a S.W. Mill ™. Electively, other trace or minor additives may be included in the above. After the dispersion step has reduced the pigment to a 7 Hegman grind gauge reading, the base is further reduced by adding the defoamers and the remaining alkaline agent essential to adjust the pH to the elected level. The final pH of this base is preferably adjusted to 8.0–8.5 with aqueous ammonia.

The above produces a paint concentrate which for aerosol paint use is further thinned down or reduced in solids or non-volatile liquids including the remainder of the volatile co-solvents, water, and remaining minor additives, illustratively anti-skinning agents, etc., thereby reducing the viscosity of the paint system to a sprayable viscosity.

The prepared paint product liquid is then delivered to the pressure filling apparatus where from about 20% to about 40% by weight of the net concentrate of the can, the propellant phase, is used to pressurize the aerosol can. Should increased pressure be desired to accomplish atomization in spray application of the product, hydrocarbons including propane, butane, and isobutane may be used to replace up to about 25% of the oxygenated propellant, if desired.

A comparison of prior art products of the general class containing water with those falling within the scope of the "set time" of the products herein are faster by about 15 minutes, the tack-free state is of the order of one hour as compared to about 6 to 8 hours of the art generally, while overnight dry is generally rated as "hard" in most cases tested on products as described herein.

Having described the invention in general terms, the following specific examples illustrate the best mode presently known to reduce the invention to practice. Parts are by weight unless otherwise specified.

EXAMPLE 1

(Black Enamel)

| (1) | 18 parts | carbon black |
|---|---|---|
| (2) | 3 parts | colloidal silica (suspend agent) |
| (3) | 15 parts | propoxy propanol |
| (4) | 1 part | defoaming agent (Patcote 550) |
| (5) | 70 parts | acrylic modified water dispersible alkyd (Reichhold Lustrasol STF 1170) |
| (6) | 5 parts | Butyl Carbitol |
| (7) | 3.5 parts | ammonia (28%) |
| (8) | 180 parts | water |
| (9) | 3 parts | cobalt paint drier |
| (10) | 1.5 parts | drier catalyst ("Activ-8") |

These were dispersed in a sand mill or pebble mill-S.W. Mill TM, (duPont Mill), etc. to a Hegman reading of 7. The above grinding phase was "let down" with:

| (11) | 260 parts | resin of line 5 |
|---|---|---|
| (12) | 13 parts | 28% NH$_4$OH |
| (13) | 1 part | silicone pigment wetting agent (SF 69) |
| (14) | 1 part | silicone defoamer (Patcote 550) |
| (15) | 2 parts | anti-skinning agent (anti-oxidant) |
| (16) | 400 parts | water |
| (17) | 21 parts | acrylic emulsion (WR 748 of Rohm & Haas) |

These were used to reduce the mill charge. The pH was adjusted to between 8.0–8.5 with ammonia (28%).

The pH adjusted liquid paint was packaged in an aerosol can. To each 37 parts of the paint concentrate were added 38 parts of solvent blend and 25 parts of the propellant, dimethyl ether. The solvent blend contained from 50–60% of acetone or ethanol in various combinations, 10% of butanol-2, 0–10% of propoxy propanol, and 10% of a heavy co-solvent (Butyl Cellosolve) along with 20–30% of water.

The product produced a spray applied dried film having a 60° specular gloss of about 90%. Use of titanium dioxide to produce a comparative white enamel sacrifices some gloss with the increased volume of pigmentation required.

EXAMPLE 2

(White Enamel)

Same as Example 1, except the 18 parts of carbon black were replaced with 160 parts of titanium dioxide pigment. The dried film, upon testing, has a gloss of 85%.

EXAMPLE 3

(Black Enamel)

The 70 parts of the acrylic modified water soluble alkyd of Example 1 were replaced with Kelsol 3921 at 80 parts in the grind phase and 300 parts Spencer-Kellogg water-soluble or dispersible monomer modified alkyd with about 14 parts of Reichhold Beckosol 13-420 water-soluble alkyd to improve flow. Otherwise, the formulation was substantially the same as Example 1.

EXAMPLE 4

Fifty parts of monomer modified alkyd resin soluble in water and basic alkali (Kelsol 3960 of Spencer-Kellogg) replaced 70 parts of Example 1 of Lustrasol STF 1170 (acrylic alkyd of Reichhold) in the grind phase and 253 parts were used of Kelsol 3960 in the "thin down" phase after grind. Twenty parts of carbon black were used in pigmentation and 100 parts additional acrylic polymer (WR 748 of Rohm & Haas) were included in the "let down" phase.

EXAMPLE 5

This white spray enamel aerosol paint was made substantially as generally described, employing 100 parts of Kelsol 3921, a monomer modified alkyd resin (soluble in water when neutralized to a pH of about 8.0 with lithium ions or with low molecular weight amines or ammonia) used in the grind phase. Here triethyl amine was used, in amounts of about 7.5 parts. In the "let down" 140 parts of Kelsol 3921 and about 114 parts of E-1810 (an emulsion acrylic latex from Rohm and Haas) were incorporated with the final pH being adjusted to 8.5 with 28% ammonia.

EXAMPLE 6

In the grind phase 160 parts of a monomer modified water-dispersible alkyd resin (Beckosol 13-400 of Reichhold) were used with 5 parts of carbon black and the other general incidental ingredients as shown in Example 1 along with 150 parts of titanium dioxide and 160 parts of water in the grind phase. An aqueous solution of lithium carbonate was used to neutralize the acidity of the first 100 parts of the 13-400 alkyd resin binder in the grind phase. 150 parts (Synthemul 40-422, containing 49% solids of a styrene-acrylic emulsion latex solid in water, of Reichhold), 10 parts of JK-270, a polysaccharide (Lorcon Chemical Co.), and 290 parts water were used in conjunction with other minor additives including the usual driers, anti-skinning agents, and foam control agents (less than about 15 parts total) were added to the let down phase following the grind.

As in Example 1, the spray enamel was filled out in pressurized aerosol cans fitted with spray valve controls (for application). The propellant consisted of about 30% of the packaged paint material, 35% of the "let down" paint after grinding and removal from the sand milling step, and a solvent blend (as generally shown in Example 1) constituting the remaining 35%. The propellant contained about 85% dimethyl ether and about 15% of butane to increase the spray head pressure.

EXAMPLE 7

In an example similar to the foregoing, 200 parts of Kelsol 3960, a chain-stopped monomer modified alkyd resin (Spencer-Kellogg), was used in producing a non-pigmented clear water-reducible aerosol paint neutralized with ammonia (28%) and about 40 parts of WL-91 (an acrylic emulsion polymer latex from Rohm and Haas.

As it is a non-pigmented clear paint, grinding was not essential and the foregoing principal ingredients were incorporated with paint making additives as shown in the foregoing examples to make a non-pigmented clear coating concentrate. This is prepared for aerosol packaging use as previously shown.

Having illustrated the best mode presently known to practice the foregoing improvement in water-reducible aerosol paint compositions, what is claimed is:

1. An aerosol paint under atomizing paint dispensing pressures characterized by a carrier water phase, a film-forming paint phase, and a liquid substantially water-miscible propellant phase in mutually compatible admixture; and polymeric, non-volatile, film-forming solids component constituting from about 5–15%, the water from about 15–40%, and said propellant about 20–40% of said aerosol paint: at least one portion of said polymeric film-forming component consisting essentially of a low molecular weight monomer modified alkyd resin of less than 6,000 units and an acid value between about 40 and 80, said acid value neutralized with an alkaline base, said base at least in part consisting of the group selected from ammonia and amines; and at least one other portion of said polymeric film-forming component consisting of an emulsion polymer latex having a molecular weight substantially greater than said alkyd, but less than 1 million; said total polymeric binder in combination in said aerosol paint with an excess of 5%, but not more than about 30% of at least one of each of the following water-miscible volatile organic solvent groups (a) low molecular weight alcohols, ketones, and esters and (b) high molecular weight glycol ethers and esters; said aerosol paint having a pH of from about 8.0 to 8.5.

2. The composition of claim 1 where the water-miscible propellant phase is selected from the group of oxygenated ethers consisting of methyl ethyl ether, dimethyl ether, propylene oxide 1–3 and propylene oxide 1–2.

3. The composition of claim 2 where the water-miscible propellant phase is dimethyl ether.

4. The composition of claim 1 where the monomer modified alkyd resin is a chain-stopped product.

5. The composition of claim 4 where the latex is a styrene-acrylic latex copolymer.

6. The composition of claim 1 where the emulsion polymer latex is an acrylic emulsion latex.

7. The composition of claim 1 where the monomer modified alkyd resin is an acrylated alkyd.

8. The composition of claim 1 where the monomer modified alkyd resin is a drying oil modified alkyd having an acid value between about 40 and 80.

9. The composition of claim 8 where a lithium base is used to neutralize about three quarters of the acid value of the monomer modified alkyd and the final pH is adjusted to about 8.0 to 8.5 with ammonia hydroxide.

10. The composition of claim 1 where the acid value of the monomer modified alkyd is reduced up to about half its value with a lithium base and the final pH adjusted to about 8.0 to 8.5 with ammonia hydroxide.

11. The composition of claim 1 where the base neutralized monomer modified alkyd resin constitutes from 95–5% by weight of the film-forming solids component and the emulsion polymer latex constitutes from 5–95% of said film-forming solids.

* * * * *